Sept. 13, 1932.  H. VON STUMM  1,876,804

VEHICLE AUXILIARY LAMP

Filed April 16, 1929

Inventor:
Herbert von Stumm,
By Byrnes, Townsend & Brickenstein,
Attorneys.

Patented Sept. 13, 1932

1,876,804

UNITED STATES PATENT OFFICE

HERBERT von STUMM, OF ROHLSTORF NEAR SEGEBERG, GERMANY

VEHICLE AUXILIARY LAMP

Application filed April 16, 1929, Serial No. 355,591, and in Germany April 21, 1928.

The present invention relates to lamps for automobiles and other vehicles mechanically propelled, of a type that illuminates a section of the road and the front of the vehicle carrying said lamp without dazzling anyone coming from the opposite direction.

Lamps of this type up to present date either illuminate that part of the road on a level with the car, that the vehicle moving in opposite direction would have to use, or a very limited surface of the road in front of the car on which they are located.

In addition they have the disadvantages of not lighting the front of the user's vehicle, and dazzling anyone moving in opposite direction by rays being projected directly into his eyes.

It is an object of the present invention to do away with these disadvantages by providing for an improved type of lamp. Other objects and advantages will become apparent as the description proceeds.

The invention provides for an auxiliary lamp, in which by means of a bellshaped screen the light is thrown obliquely in front of the car, towards the direction the driver will have to follow to avoid collision with vehicles or persons approaching in his direction, that is to the right side of the road. The screen allows rays to fall downwards in any direction and besides reflects a portion of these rays onto the front of the vehicle.

The screen, constructed in the form of a bellshaped reflector, is, according to the invention, open at the bottom and furnished with a triangular incision on the right side. Behind the source of light, opposite this incision, a reflector is fixed.

The rays of light, reflected downwards or, from the screen, backwards, light up the front portion of the car, especially the radiator, when the ordinary headlights are switched off to avoid dazzling the operator of an approaching vehicle. Thus type and size of the car can be easily recognized at a sufficient distance by anyone moving in opposition direction, the rays thrown obliquely forward towards the right side, enable him to get a thorough estimate of the car's distance and speed. The driver behind the lamp can steer close to the edge of the road in perfect safety. If he has to pass a vehicle or person moving in the same direction, the latter as well as his own car are both illuminated, showing both to anyone coming from the opposite direction, who now will act accordingly. In narrow lanes, streets or roads with high borders of any sort, the light reflected by these border helps materially towards lighting up the whole road for all parties.

When using the lamp for motorcycles, there being no radiator behind the lamp, the rays are allowed to fall downwards and backwards, thereby illuminating the machine as well as the sidecar without their being able to dazzle the driver, whose seat is above the level of the rays.

The invention will now be described more fully with reference to the accompanying drawing, in which various forms of embodiment are illustrated by way of example. The illustration is diagrammatical.

Figure 1:
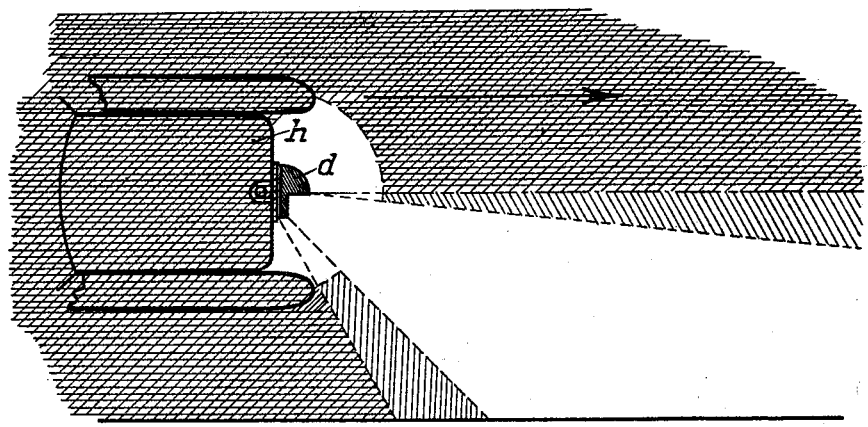
Fig. 1 shows the distribution of the light in connection with a motor vehicle, in which the lamp is mounted on the front and at the centre of the radiator.
Figure 2:
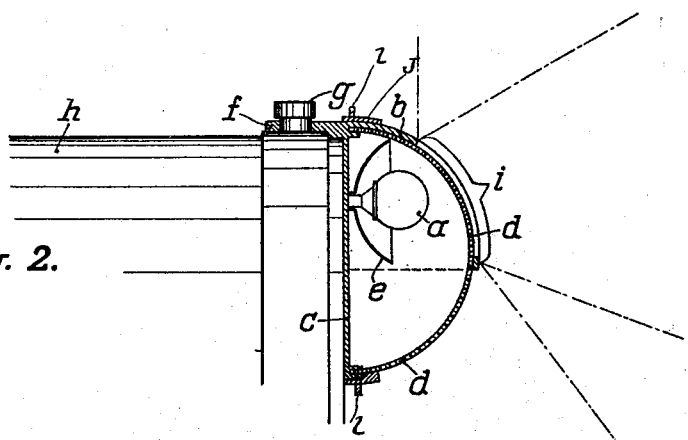
Fig. 2 is a vertical section through the lamp.
Figure 3:
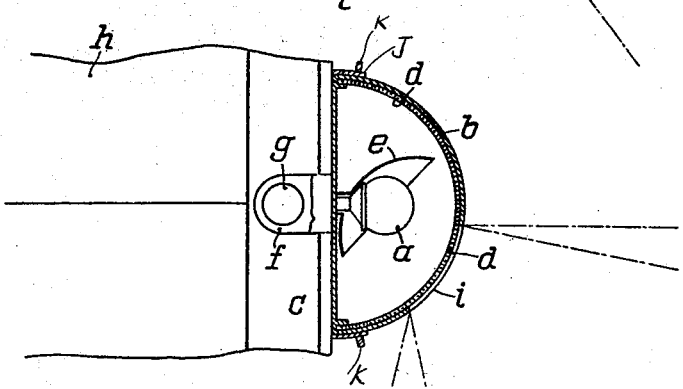
Fig. 3 shows the same lamp in horizontal section.

Referring now to the drawing, $a$ is an electric lamp, which is mounted on a casing $c$ having flat vertical wall at the rear and is protected by means of a hemispherical glass bell or globe $d$. The upper portion of the globe or bell $d$ is covered by means of a screen, which is made of sheet metal and the inner face of which is furnished with a reflectory coating. At $i$ the screen or shutter $b$ is recessed in such manner that a spherical triangle of the glass globe remains exposed. The globe $d$ is secured to the casing $c$ by a ring $j$ cooperating with bayonet lugs 1. Behind the lamp $a$ situated opposite to the said recess is provided an auxiliary reflector $e$, which reflects a strong pencil of rays through the recess $i$.

The lamp is connected with the source of current in such manner that the same is switched on when switching on the normal shuttering device. In order, however, to be able to switch off the same per se a special switch is connected across the circuit, this switch being preferably mounted on the dashboard of the vehicle.

It will be understood that no restriction is made to the particular forms of embodiment shown, but that various modifications are quite possible without departing from the spirit of the invention.

What I claim as new and desire to secure by Letters Patent is:

In a vehicle headlight in combination, a source of light, a reflector disposed behind said source of light, a casing for said source of light and said reflector including a domed translucent cover disposed in front of said source of light, an opaque screen disposed adjacent the portion of said cover above the horizontal medial plane of said cover and having a reflecting interior surface, a substantially triangular aperture being provided in the portion of the screen disposed on that side of the vertical medial plane on which side of the roadway the vehicle travels to avoid vehicles proceeding in the opposite direction.

In testimony whereof, I affix my signature.

HERBERT von STUMM.